Sept. 7, 1937. J. R. BROSSMAN 2,092,636
INSULATED COPPER WIRE
Filed Feb. 14, 1936
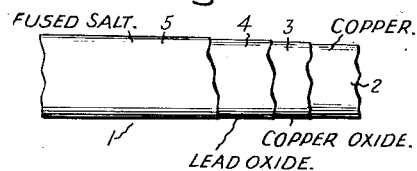
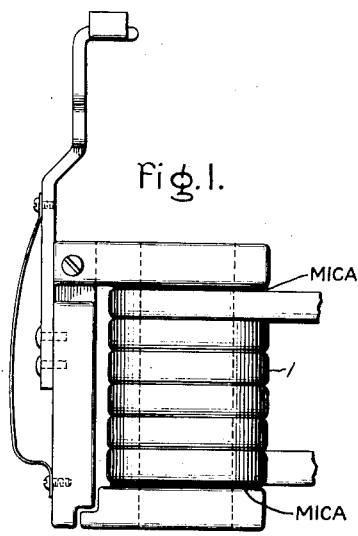
Inventor:
Jacob R. Brossman,
by Harry E. Dunham
His Attorney.

Patented Sept. 7, 1937

2,092,636

UNITED STATES PATENT OFFICE 2,092,636

INSULATED COPPER WIRE

Jacob R. Brossman, Yeadon, Pa., assignor to General Electric Company, a corporation of New York Application February 14, 1936, Serial No. 63,875

5 Claims. (Cl. 173—264)

The present invention relates to electrically insulated copper wire and more particularly to insulated copper conductors which are adapted for use as overload tripping coils in circuit breakers.

In certain types of circuit breakers the space available for the tripping coils is limited and the number of series turns necessary for the coil reduces the size of wire which may be employed to such an extent that only a very thin coating of insulation is permissible. For example in circuit breakers rated at about 15 to 100 amps, the wire employed in the tripping coil varies in diameter from about .070 inch to about .150 inch, while the coil is about five-eighths of an inch in diameter and about three-fourths of an inch long. Although the insulation between successive turns of such a coil does not have to be very high it should be capable of withstanding about 7 to 15 volts. In addition to this requirement the insulation should be ductile and due to space limitations, not appreciably thicker than about .008 inch. It should also be capable of withstanding temperatures in the neighborhood of 800° C. which may be caused by temporary overloads on the system.

The novel features which are characteristic of my invention are set forth with particularity in the appended claims. My invention itself however will be better understood by reference to the following specification when considered in connection with the accompanying drawing in which Fig. 1 is a view in elevation and on an enlarged scale of a tripping coil mounted on a portion of a circuit breaker and embodying the features of the present invention while Fig. 2 is a plan view on a further enlarged scale of a portion of the wire coil showing successive layers applied to a copper conductor.

Referring more particularly to the drawing, I have indicated at 1 a tripping coil mounted on a portion of a circuit breaker and adapted to be connected in series with a source of current supply not shown. The coil 1 consists of a copper wire 2 provided with a thin ductile insulating coating about .008 inch thick which consists of successive layers of copper oxide, lead oxide and a high melting point salt.

In carrying out my invention the copper coil 1 is first provided with a coating 3 of red copper oxide which may, if desired, be produced by thoroughly heating the bare copper coil in a muffle type furnace maintained at a temperature of 650° C. and then quenching in water. The oxide coated coil is then covered with a loose thin film of lead obtained by immersing the oxide coated coil in a lead nitrate bath preferably in an aluminum container. The lead coated coil is washed in water, care being exercised not to wash away the loosely adhering lead, and then converted to lead oxide or litharge to form the intermediate coating 4. The formation of lead oxide may be accomplished by heating the lead coated coil at about 500° C. for a short period of time in a muffle type furnace. After removal from the furnace the coil is heated at a temperature of about 200° C. and the outer coating 5 obtained by applying to the coil a paste consisting substantially of a mixture of powdered sodium perborate, powdered barium carbonate and water, said paste preferably containing 8 to 9 parts by weight of the perborate and 1 to 2 parts by weight of the carbonate. The paste may be applied to the coil by dabbing it with a stiff brush. The heated coil evaporates the water in the mixture and leaves the mixed perborate and carbonate sticking to the surface of the coil. The coil is now heated in an oven at an elevated temperature, preferably in the neighborhood of about 850° C. to 900° C., for a period of time sufficient to completely fuse the salts and coatings. The coil is then removed from the oven and cooled. The terminals of the coil are ground and tinned after which it may be mounted for use in a circuit breaker as indicated in Fig. 1.

The temperatures and time involved in the various operations are merely illustrative and not critical and may be changed to meet varying requirements. Moreover, although I employ a bare copper wire in the formation of the coil, it will be apparent that the wire may have merely a copper or cupreous surface thereon which surface may be changed to copper oxide after which the lead oxide and fused salt coatings may be applied as hereinbefore pointed out.

What I claim as new and desire to secure by Letters Patent of the United States, is:

1. An electrical conductor having a copper oxide coating thereon and an outer coating consisting substantially of a fused mixture of sodium perborate and barium carbonate.

2. An electrical conductor having a copper oxide coating thereon, an outer coating consisting of a fused mixture of sodium perborate and barium carbonate and an intermediate coating of lead oxide.

3. An electrical conductor having a copper oxide coating thereon and an outer coating consisting substantially of a fused mixture of sodium perborate and barium carbonate, the barium carbonate comprising about 1 to 2 parts by weight and the sodium perborate about 8 to 9 parts by weight of said outer coating.

4. An insulated copper wire having a copper oxide coating thereon, an outer coating consisting substantially of 1 to 2 parts by weight of barium carbonate and about 8 to 9 parts by weight of sodium perborate and an intermediate coating of lead oxide.

5. An insulated copper wire coil adapted for use in a circuit breaker, the turns of said coil being insulated from one another by inner, outer, and intermediate coatings on said wire, said inner coating consisting substantially of copper oxide, said intermediate and outer coatings consisting respectively of lead oxide, and a fused mixture of sodium perborate and barium carbonate.

JACOB R. BROSSMAN.